2 Sheets—Sheet 1.

W. H. WINDER.

INDICATOR.

No. 11,670. Reissued June 21, 1898.

WITNESS

Wm. E. Jones

H. Smith.

INVENTOR

Will H. Winder.

THE NORRIS PETERS CO., PHOTO-LITHO., WASHINGTON, D. C.

W. H. WINDER.

INDICATOR.

No. 11,670. Reissued June 21, 1898.

WITNESS

Wm. E. Jones

K. Smith,

INVENTOR

Will H. Winder

THE NORRIS PETERS CO., PHOTO-LITHO., WASHINGTON, D. C.

UNITED STATES PATENT OFFICE.

WILL H. WINDER, OF CARTHAGE, OHIO.

INDICATOR.

SPECIFICATION forming part of Reissued Letters Patent No. 11,670, dated June 21, 1898.

Original No. 583,640, dated June 1, 1897. Application for reissue filed March 12, 1898. Serial No. 673,670.

*To all whom it may concern:*

Be it known that I, WILL H. WINDER, a citizen of the United States, and a resident of the town of Carthage, in the county of Hamilton and State of Ohio, have invented certain new and useful Improvements in Indicating Apparatus, of which the following is a specification.

One of the primary objects of my invention is to present the numbers more quickly to the display-opening and to remove them therefrom more quickly than has hitherto been done.

My invention dispenses with the latching device heretofore in use and provides a construction whereby when a number is pushed forward it locks itself and is held in position without any additional locking device and without knocking of the rods.

My invention renders the operation of presenting the display-number, holding it for inspection, and withdrawing it from sight more simple and renders the cost of the machine considerably less.

My invention obviates the friction heretofore necessarily present on the block and which friction wore out the other machinery to a great extent.

My invention simplifies the whole mechanism and makes the entire operation easier. For example, in the mechanism shown in Letters Patent No. 529,118 there are two notches in each rod and the operator was compelled to use both hands at the same time, unlocking the latch device with one hand and drawing back the numbers with the other hand.

By my invention the operator uses but one hand, and in fact a one-armed man could operate my machine.

My machine works twice as quickly as the said machines heretofore used.

By my invention I can show four (4) figures in twelve (12) seconds, and if there is a mistake made, if a wrong number is put out accidentally, it can be drawn back so quickly that it cannot be noticed. In the said machines heretofore made the number of the machine gets locked and cannot be withdrawn immediately.

The several features of my invention and the various advantages resulting from their use, conjointly or otherwise, will be apparent from the following description and claims.

Figure 1:
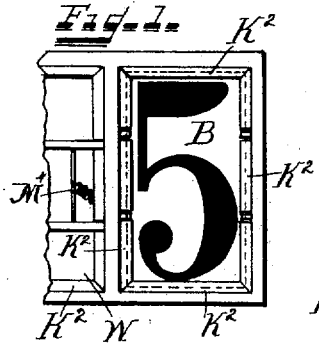
Figure 2:
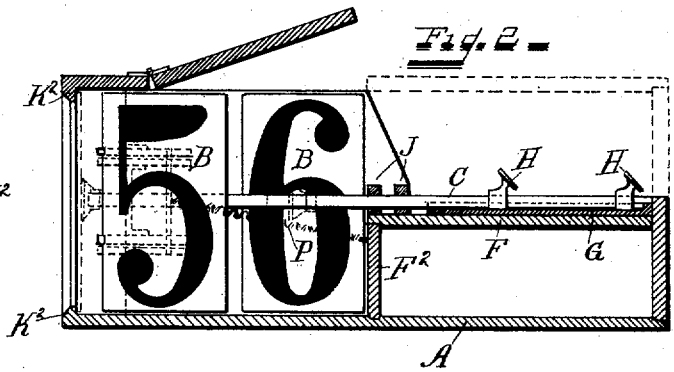
Figure 3:
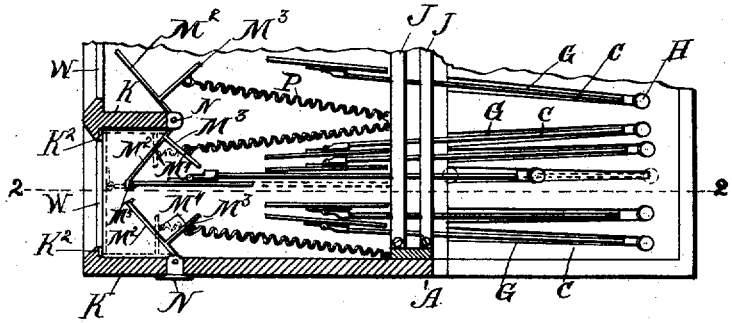
Figure 5:
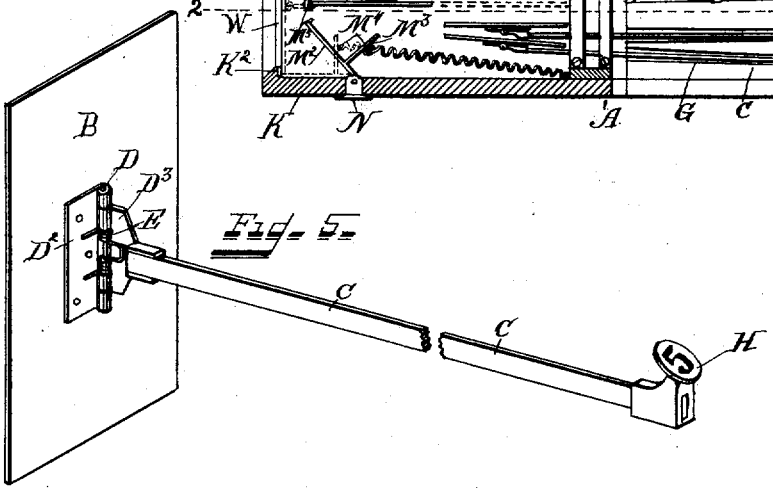
Figure 4:
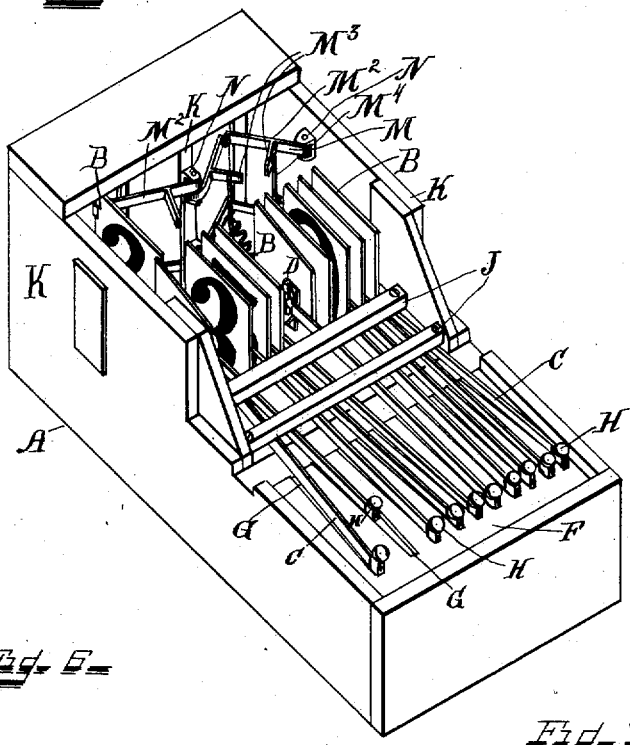
Figure 6:
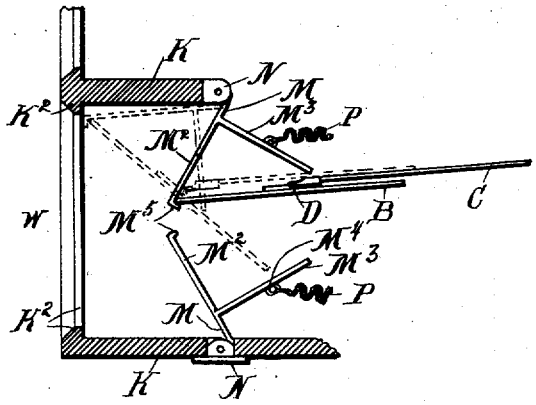
Figure 7:
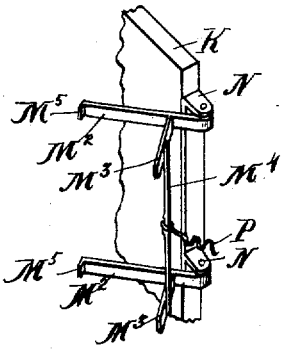

In the accompanying drawings, included on two sheets of the specification and making a part of this application, and in which corresponding letters of reference indicate corresponding parts, Figure 1 represents a part of the front end of a mechanism illustrating my invention. This view shows one of the front display-apertures filled by an index-plate and also shows a portion of another display-aperture and of the compartment behind said aperture and of the mechanism located in the forward portion of the said compartment. Fig. 2 is a side elevation of the mechanism for advancing the index-plate and for turning the plate as it moves forward so as to present the index-face of the plate at the front of the machine when the plate has been fully moved forward. This view shows two index-plates, one in the rear position it occupies when not in use and another when advanced part way toward the display-aperture. The elevation is taken after the removal of all that portion of the machine which in Fig. 3 is below the plane of the dotted line 2 2 and is of that face of the remaining mechanism which faces downward in Fig. 3. Fig. 3 is a plan view of the mechanism, a part of the same being omitted because the latter is a mere duplicate of the portions shown. In Fig. 2 the cover of the casing inclosing the mechanism is depicted as elevated. In Fig. 3 the upper portion of the casing has been removed. In both Figs. 2 and 3 the position of one of the index-plates advanced is shown by dotted lines. Fig. 4 is a view in perspective of the mechanism of my invention, one of the index-plates being shown partially advanced. The main portion of the cover has been removed and the mechanism laid bare. The view is taken from above and at the rear of the machine. Fig. 5 is a view in perspective of the rear side of one of the index-plates and of the operating-rod and its index and of the mechanism connecting the rod to said plate. Fig. 6 is a top view of the front portion of one of the compartments and of the mechanism at the front and illustrating how the said mechanism operates to properly turn an index-plate as it is moved forward to the index-aperture. This illustration is assisted by dotted lines showing another position of the plate and said operating mechanism in the process of turning the plate. Fig. 7 is a view in perspective of the device for catching the index-plate and turning it, as hereinafter mentioned.

A indicates the casing, of any suitable description. In the forward half or portion of this box are the index-plates B. For the sake of simplicity of operation each of these index-plates B is primarily moved forward or backward by means of rod C, connected to its rear side. For the sake of easily manipulating the plate and obviating the necessity of laterally moving the rod from the line of its travel it is connected to the plate at about the middle of the latter. The plate when back out of use lies parallel to its rod, substantially as shown in Figs. 3 and 4. When being thrust forward, it rotates on its axis. As the plates are preferably located so that their length is vertical, the connection between them and their operating-rod is such as to allow each plate to rotate on its long axis. To this end a hinge D is present, one half $D^2$ of the hinge being fastened to the plate and the other half $D^3$ to the rod C. A spring E, connected to the two halves of the hinge continually by its elastic pressure, tends to turn the plate into a plane parallel to the length of the rod C and keep it in that position. A common support for the rear end of each rod consists of the platform F. Runways in the form of grooves G are provided on this platform, a runway for each rod. Thereby each rod is kept in its own proper place and is prevented from lateral deflection and from interference with adjacent rods. In this way the index-plate of a given rod is advanced and retracted in a given path and in accordance with the general design of the mechanism.

The front side of each plate is made to bear a given character or sign. In the present illustrative instance the plate bears a number, and the casing includes enough plates and their operative mechanism to indicate all that is necessary or desired. In Fig. 1 a plate whose front carries the figure "5" is shown, and in Fig. 2 the front sides of two plates are shown, the one carrying the figure "5" and the other the figure "6."

The operating-rod C of a given plate B bears the same character as is on the front of the plate which it operates. This character is located on the rod in a conspicuous place. Inasmuch as the rods C are conveniently operated from and at the rear of the machine I locate the rod-number on the rear end of the rod on a raised and inclined plate H, the latter facing upward and rearward, substantially as shown in Figs. 2, 4, and 5. This position of these rod-numbers enables them to be readily seen and the rod for operating a plate having a given number to be readily distinguished. An additional means for holding the rods respectively in line consists of the fixed cross parallel pieces J J. The pieces J respectively pass over the rods and lie close above the latter, but do not bind them. These guides J J prevent the rods from being lifted out of place through accident or otherwise.

Each front compartment is included between the parallel walls K K. In this front of the compartment is a front aperture W, and therein is a beading or flange $K^2$, extending around the aperture and slightly diminishing the size of the aperture. This flange $K^2$ serves as an abutment against which the plate when presented is held and against which it rests. The plate B is light and is usually suspended by hinge D and out of contact with the floor. This suspension of the plate is obviously one of great advantage.

All of the mechanism thus far described is old as regards my present invention.

I will now proceed to describe my invention and also its special application in connection with the mechanism already described, premising that the purpose of my invention is to guide each plate B as it is advanced and turn it and coöperate in carrying it forward until it is in place at the front aperture W, and vice versa, coöperate to properly carry the plate back and allow it to fold back properly against its rod as the latter retracts it, (the plate.)

M indicates a carrier consisting of the upper and lower arms $M^2$ $M^2$ and the supplemental arms $M^3$ $M^3$, the latter united by the vertical rod $M^4$. The arms $M^3$ are respectively united to the arms $M^2$ at or near the rear of the latter and at substantially a right angle thereto. The arms $M^2$ and $M^3$ are each preferably in duplicate, so as to better control the upper and lower portion of the plate B at the same time and compel the latter to move evenly forth and back. Were this latter object unimportant one arm $M^2$ and its arm $M^3$ would be sufficient. The arms $M^2$ at one end are hinged to the adjacent wall K by suitable hinge connections, one desirable form of such hinge being shown at N.

A spring P is connected so as to draw the arms $M^2$ and $M^3$ back to the position shown in Figs. 3, 4, and 6. This spring is preferably a coiled one, and is therefore connected at one end to a fixed rear portion of the frame of the machine—as, for example, the partition $F^2$, which latter also serves to assist in upholding the forward end of the platform F. The outer or free end of each arm $M^2$ is provided with a short projection $M^5$, standing at right angles to the length of the arm $M^2$ and directed backward. The length of each arm $M^2$ is equal to the distance between the hinge N and that point in the aperture where the plate is to be displayed.

In practice when a given plate B is to be displayed the operator finds its rod C, and he does this readily with the assistance of the rear plate H. He then pushes the rod C forward. The raised rear plate H serves as a convenient handle with which to move the rod. As the rod C is advanced it likewise moves its front plate B forward. The front edge of the latter strikes against the inner side of the arm $M^2$ in front of it, as illustrated in the nearest compartment of Fig. 4, and pushes this arm forward, the front edge of the plate B sliding along the rod until it rests against the projections $M^5$ of the arms $M^2$, as shown in Figs. 3 and 6. The rod C, being continually advanced and the free end of arm $M^2$ moving in a circle, soon carries (by means of the projection $M^5$) the forward edge of the plate B around with it toward the adjacent wall K of the compartment, as shown in dotted lines in Fig. 6. The rod C being yet further advanced, the free end of arm $M^2$ finally rests at aperture W against the adjacent wall K, and the edge of the plate B, which has accompanied the free end of said arm $M^2$ in the movement of the latter, is in proximity to wall K and rests against the rear side of the adjacent flange $K^2$ of the aperture W. In this part of the operation when a large number of plates are present in a division and these are heavy the arms $M^3$ of this device M perform an important part in pressing that part of the plate B which is yet behind the hinge D forward at the same time the front edge of the plate B is moving with the arms $M^2$, as mentioned. The rod C, being still advanced, carries the rest of the plate B forward and compels the latter to move forward, thus turning the front side of the plate B wholly frontwise. During this movement it presses to one side the opposite and complementary arms $M^2$ of the compartment, which latter by their pressure through the agency of their springs P operate to keep the first-named or original front edge of the plate in its position against the first-named wall K and close against the adjacent portion of flange $K^2$ and prevent the second or original rear edge of the plate from coming into contact with the adjacent wall K. Thus the plate B is fully turned with its front to the flange $K^2$ and its edges brought against said flange. It now displays the character it bears. In withdrawing the plate the operations just described are reversed. The pressure of the spring E at the junction of the rod and plate B is overcome as the plate is moved forward and turned, and this spring E acts and asserts its supremacy as the plate is drawn back and the hold and pressure of the arms $M^2$ $M^3$ upon it are removed.

It will be observed that the rods on one side of the longitudinal median line of a compartment are grouped together and converge at their front ends. The object of this arrangement is so that the rods of this group shall point toward substantially the same location or spot on the arms $M^2$ $M^2$ of the device M on that side of the compartment. The rods of the other group converge and point toward a point on the opposing or complementary device M of the compartment. Thus every plate B as it is advanced is certain of striking the arms $M^2$ of the device M in front of it.

My invention is very simple of construction, light of weight, easy of application, economical of cost, is not liable to get out of order, is accurate in movement, and carries the display-plate B to the front and turns it frontwise and to a display position quickly and easily, and returns it with precision toward its first position of non-use.

The number of plates used in a division or a compartment may be varied as the purpose for which the machine is to be used may require. For example, when a machine is used to announce time which horses cover the course, four openings or compartments are usually required, one of these for the display of the number of minutes taken, and two compartments are used for the seconds, and another (the fourth) compartment is used for fractions of a second. In such event, inasmuch as horses cover the course in a period not to exceed four minutes, only four plates respectively carrying the numerals from "1" to "4," are needed. In the second compartment, as the number of seconds to be displayed never exceeds fifty-nine, only five plates, respectively marked from "1" to "5," need be present. In the third compartment a figure naught (0) and numerals from "1" to "9" would be needed and be present. In the fourth compartment are plates respectively bearing such fractions of a second as are usually employed. In the eastern circuit the time is taken by fifths of a second, and this compartment would therefore hold four plates, whereas in the central and western circuits the compartment would require only three plates, because quarters of seconds are employed. In connection with this time-machine I use another of my said machines which I term a "result-machine," using it to display the number of the winning horse. As the number of competing horses never exceeds thirty, but two compartments are needed, the first one requiring only three plates to cover the numbers "1," "2," and "3," and the second compartment would contain ten plates, respectively carrying the nine numerals and a cipher.

The foregoing sufficiently illustrates how and why the number of plates in each compartment or room may be varied. Of course every machine and every compartment, where there are more than one, could be made to carry a large number of plates; but in such event one is compelled to carry a certain number that are never used.

The desirability of the presence of the angulated arm $M^3$ will obtain as follows: The construction shown in Fig. 4 is adapted for a large-number machine. In what I term a "large-number machine" the numbers are fourteen inches in height. In such a machine in pushing forward the middle number of the plates it may be said the angulated arm $M^3$ never operates them. It only operates on those plates while being advanced which are at or near the sides of the compartment. For instance, the outer plate B strikes the arm $M^2$ nearer the hinge or pivot N, and hence is assisted by the angulated arm.

On a small-number machine the angulated arm is not used at all in any event, because the plates are light enough to turn themselves without the aid of the angulated arm; but in no case is the angulated arm an absolute necessity. In what I denominate a "small-number machine" the plates are nine inches in height. In constructing the smaller machine I make the plates on which the numbers are painted of a lighter material. The angulated arm $M^3$ is never used except when the plates in the division are large and heavy and numerous, and then the arm only operates as aforementioned on the extreme outside plates.

In a machine where the plates are large and heavy if the number of plates is such that you can place them all in the vicinity of the center portion of the machine then the angulated arm would not be of assistance.

There are cases where it is not necessary to duplicate the device M—that is to say, there are cases where one of the two complementary devices in a compartment may be dispensed with. In this event but one of such devices M may be employed, and it will successfully operate. Whether one or two of such devices M are to be employed in the same compartment will usually be determined by the number of display-plates required or present in the compartment.

The indicating apparatus described is applicable to a number of different uses, and in the following claims I desire their scope to be understood as covering the features therein respectively claimed for any of the various indicating purposes for which one or more of them (the said features) can be respectively applied either in this particular machine or in other machines.

Having thus described my invention, what I claim as new, and desire to secure by Letters Patent, is—

1. In an indicating apparatus, the combination of a display-plate, means for advancing said plate pivotally connected thereto, and swinging means for engaging the plate as it advances and thereby causing it to turn into its display position, substantially as described.

2. In an indicating apparatus, the combination of a display-plate, means for advancing said plate pivotally connected thereto, swinging means for engaging the plate as it advances and thereby causing it to turn into its display position, and means for locking said plate in its display position, substantially as described.

3. In an indicating apparatus, the combination of a display-plate having an advancing means hinged or pivotally connected thereto, a stop whereby the plate is held in display position when advanced, and swinging restraining means for causing the plate as advanced to assume its display position, substantially as described.

4. In an indicating apparatus, the combination of a display-plate, a sliding rod pivotally connected thereto, means for engaging one side of the plate as it advances and thereby causing it to turn into its display position, and means for engaging the other side of said plate when in its display position and thereby locking it therein, substantially as described.

5. In an indicating apparatus, the combination of a display-plate, a rod pivotally connected thereto, a swinging arm adapted to engage and turn said plate as it advances into its display position, and means for locking said plate in its display position, substantially as described.

6. In an indicating apparatus, the combination of a casing provided with an aperture, a display-plate in said casing, a rod pivotally connected thereto, a swinging arm provided with a projection at its free end adapted to engage and turn said plate and means for locking said plate in its display position, substantially as described.

7. In an indicating apparatus, the combination of a casing, provided with an aperture, a display-plate in said casing, a sliding rod pivotally connected thereto, a swinging arm provided with a projection at its free end adapted to engage and turn said plate, means for automatically retracting said arm when the rod is drawn back, and means for locking said plate in its display position, substantially as described.

8. In an indicating apparatus, the combination of a casing provided with an aperture, a display-plate in said casing, a sliding rod pivotally connected thereto, two swinging arms provided with projections at their free ends, one of said arms being adapted to turn said plate as it advances and the other to lock it in its display position, substantially as described.

9. In an indicating apparatus, the combination of a casing provided with an aperture, a display-plate in said casing, a sliding rod pivotally connected to said plate, two swinging arms, each provided with a projection at its free end adapted to engage and turn said plate pivoted to said casing and arranged opposite to each other and springs for retracting said arms when the rod is drawn back, substantially as described.

10. In an indicating apparatus, the combination of a frame, an index-plate adapted to stand edgewise when not in use, and flatwise when in use as a display-sign, a reciprocating rod for advancing the plate, front abutments for the index-plate, and a reciprocating device for operating on the plate, this device consisting of a pivoted arm, and an arm angulated thereto, and a spring for elastically returning this reciprocating device to its first position when free to so do, substantially as described.

11. In an indicating apparatus, the combination of the index-plate, making its preliminary advance edgewise, and the arm $M^2$ hinged at one end to the frame, and provided at its free end with a projection and with an angulated arm connected to the arm $M^2$, and spring P connected to the angulated arm and to the frame, and swinging restraining means for engagement with the display-plate, substantially as described.

12. In an indicating apparatus, a front apertured frame having detents $K^2$, and an index-plate adapted to make its preliminary advance toward the said aperture, and an arm $M^2$ hinged at one end and carrying swinging restraining means at the other, and having the angulated arm $M^3$, and a spring connected substantially as described and adapted to elastically draw back the arm into the first position whenever free to do so, substantially as described.

13. In an indicating apparatus, a frame having a front aperture and having detents $K^2$, and an index-plate adapted to make its preliminary advance toward the said aperture, and a rod for advancing the plate, and hinged thereto, and a spring for elastically keeping the plate edgewise when allowed to so do, and an arm $M^2$ hinged at one end and carrying the swinging restraining means and having the angulated arm $M^3$, and a spring adapted to elastically draw back the arm into its first position whenever free to so do, substantially as described.

14. In an indicating apparatus, a compartment or division, a front aperture thereof, and an index-plate, and means for advancing the latter, and a spring for locating the plate edgewise to the aperture when free so to do, and two sets of independent devices each having an arm $M^2$ hinged at its outer end, and provided at its free end with a detent projection $M^5$ and an angulated arm $M^3$, and a spring strained between the said device and a portion of the frame for drawing the arms $M^2$, $M^3$ back to a given position, the projections $M^5$ of the respective arms being nearest as the arms are moved, these two independent opposite devices coöperating to properly turn the plate as the latter is advanced and locate it at the aperture, and properly assist in returning the plate to its first position, substantially as and for the purposes specified.

15. In an indicating apparatus, the combination of the plate in its rear position standing edgewise to the front of the machine and front abutments to receive the index-plate when advanced and in a display position, the device M consisting of the two arms $M^2$, $M^2$ each carrying the arm $M^3$ angulated thereto, and each having end projections $M^5$ and the connecting-rod $M^4$, and spring P operating between the rod $M^4$ and a fixed portion of the stationary frame of the machine, substantially as described.

16. In an indicating apparatus, the combination of the plate in its rear position standing edgewise to the front of the machine, and front abutments to receive the index-plate when advanced and in a display position, the devices M each consisting of the two arms $M^2$, $M^2$, each carrying the arm $M^3$ angulated thereto, and each having end projections $M^5$, and the connecting-rod $M^4$, and spring P operating between the rod $M^4$ and a fixed portion of the stationary frame of the machine, the devices M being present and oppositely disposed in the compartment, and coöperating to turn the plate edgewise as it is retracted, substantially as described.

17. In an indicating apparatus, the combination of the plate, in its rear position standing edgewise to the front of the machine, and front abutments to receive the index-plate when advanced and in a display position, the devices M each consisting of the two arms $M^2$, $M^2$, each carrying the arm $M^3$ angulated thereto, and each having swinging restraining means for causing the plate to assume its display position, and the connecting-rod $M^4$, and spring P operating between the rod $M^4$ and a fixed portion of the stationary frame of the machine, the devices M being present and oppositely disposed in the compartment, and coöperating to turn the plate edgewise as it is retracted, a rod hinged to the plate, and a spring adapted to elastically move the plate so as to bring the plate flatwise to the side of the rod, substantially as described.

18. In an indicating apparatus, the combination of the plate, in its rear position standing edgewise to the front of the machine, and front abutments to receive the index-plate when advanced and in a display position, the devices M each consisting of the two arms $M^2$, $M^2$, each carrying the arm $M^3$ angulated thereto, and each having end projections $M^5$ and the connecting-rod $M^4$, and spring P operating between the rod $M^4$ and a fixed portion of the stationary frame of the machine, the devices M being present and oppositely disposed in the compartment, and coöperating to turn the plate edgewise as it is retracted, a rod hinged to the plate, and a spring adapted to elastically move the plate so as to bring the plate flatwise to the side of the rod, and a platform for supporting the rods and guides for compelling the rod to run longitudinally in a given line, substantially as described.

WILL H. WINDER.

Attest:
WM. E. JONES,
K. SMITH.